US012347372B2

(12) United States Patent
Yoon et al.

(10) Patent No.: US 12,347,372 B2
(45) Date of Patent: Jul. 1, 2025

(54) PIXEL CIRCUIT AND DISPLAY DEVICE

(71) Applicant: LG DISPLAY CO., LTD., Seoul (KR)

(72) Inventors: MunChae Yoon, Seoul (KR); ByeongUk Gang, Seoul (KR); Seonghwan Hwang, Seoul (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/050,999

(22) Filed: Oct. 30, 2022

(65) Prior Publication Data

US 2023/0186853 A1 Jun. 15, 2023

(30) Foreign Application Priority Data

Dec. 13, 2021 (KR) ........................ 10-2021-0177727

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/0233* (2013.01); *G09G 2320/043* (2013.01); *G09G 2330/021* (2013.01)

(58) Field of Classification Search
CPC ......... G09G 3/3233; G09G 2300/0842; G09G 2310/08; G09G 2320/0233; G09G 2320/043; G09G 2330/021; G09G 3/3275; G09G 2320/0261; G09G 2320/0285; G09G 3/3225; G09G 3/3266; G09G 3/2074
See application file for complete search history.

(56) References Cited

U.S. PATENT DOCUMENTS

| | | | | |
|---|---|---|---|---|
| 6,249,326 | B1 * | 6/2001 | Hebiguchi | G02F 1/136213 349/139 |
| 9,053,664 | B2 | 6/2015 | Lee | |
| 9,111,491 | B2 | 8/2015 | Woo et al. | |
| 10,002,569 | B2 * | 6/2018 | Park | G09G 3/3291 |
| 10,008,152 | B2 * | 6/2018 | Jang | G09G 3/20 |
| 10,204,565 | B2 * | 2/2019 | Park | G09G 3/3291 |
| 10,366,651 | B2 * | 7/2019 | Ha | G09G 3/3233 |
| 10,593,241 | B2 * | 3/2020 | Hong | G09G 3/3233 |
| 10,699,654 | B2 * | 6/2020 | Lim | G09G 3/3648 |
| 2007/0046579 | A1 * | 3/2007 | Jung | G09G 3/296 345/68 |

(Continued)

FOREIGN PATENT DOCUMENTS

| | | |
|---|---|---|
| KR | 10-2011-0104705 A | 9/2011 |
| KR | 10-2013-0055257 A | 5/2013 |
| KR | 10-2014-0081450 A | 7/2014 |

OTHER PUBLICATIONS

Korean Office Action dated Oct. 10, 2024 issued in Patent Application No. 10-2021-0177727 (6 pages).

*Primary Examiner* — Jeff Piziali
(74) *Attorney, Agent, or Firm* — Fish & Richardson P.C.

(57) ABSTRACT

A pixel circuit for a display device includes a light emitting element, a driving transistor for driving the light emitting element, a scan transistor controlled by a scan signal supplied from a gate line and controlling a connection between a first node of the driving transistor and a data line, a storage capacitor connected between the first node of the driving transistor and a second node of the driving transistor, and a driving control diode connected between the second node of the driving transistor and a reference voltage line.

22 Claims, 10 Drawing Sheets

(56) References Cited

U.S. PATENT DOCUMENTS

| | | | | |
|---|---|---|---|---|
| 2008/0278427 | A1* | 11/2008 | Jang | G09G 3/3688 345/98 |
| 2010/0085339 | A1* | 4/2010 | Tanaka | H01L 27/1446 257/292 |
| 2011/0227505 | A1 | 9/2011 | Park et al. | |
| 2013/0127692 | A1* | 5/2013 | Yoon | G09G 3/3258 345/80 |
| 2014/0078194 | A1* | 3/2014 | An | H04N 13/31 345/691 |
| 2016/0163264 | A1* | 6/2016 | Nishimura | G09G 3/3266 345/212 |
| 2018/0004329 | A1* | 1/2018 | So | G09G 3/20 |
| 2020/0074930 | A1* | 3/2020 | Lee | G09G 3/3233 |
| 2020/0212279 | A1* | 7/2020 | Son | H01L 25/0753 |
| 2020/0372858 | A1* | 11/2020 | Mobasher | G09G 3/20 |
| 2021/0225290 | A1* | 7/2021 | Kang | G09G 3/3275 |
| 2021/0259086 | A1* | 8/2021 | Xu | G06F 1/26 |
| 2022/0173664 | A1* | 6/2022 | Shen | H02M 3/33507 |
| 2022/0328574 | A1* | 10/2022 | Jiang | H01L 27/0292 |

* cited by examiner

PIXEL CIRCUIT AND DISPLAY DEVICE

CROSS-REFERENCE TO RELATED APPLICATION

This application claims the priority of Korean Patent Application No. 10-2021-0177727, filed on Dec. 13, 2021, which is hereby incorporated by reference in its entirety.

BACKGROUND

Field of the Disclosure

The present disclosure relates to a pixel circuit and a display device.

Description of the Background

As the information society develops, demand for display devices for displaying images is increasing in various forms. Various types of display devices, such as liquid crystal display devices and organic light emitting display devices, are being utilized in recent years.

Upon displaying video, display devices can cause an afterimage of the previous image or motion blur due to slow video response, degrading image quality.

As such, displays suffer from afterimage or motion blur issues. Various methods have been proposed to prevent or mitigate motion blur. However, the previously proposed methods require a complicated driving method or may cause side effects.

SUMMARY

Accordingly, the present disclosure is to provide a novel method for preventing motion blur without the need for complicated driving scheme or causing side effects.

The present disclosure is to provide a novel pixel circuit capable of effectively preventing motion blur without complicated driving and a display device including the same.

The present disclosure is also to provide a novel pixel circuit capable of reducing the number of gate lines and a display device including the same.

The present disclosure is also to provide a novel pixel circuit capable of simplifying driving and having a high aperture ratio, and a display device including the same.

In an aspect of the present disclosure, a display device includes a light emitting element, a driving transistor for driving the light emitting element, a scan transistor controlled by a scan signal supplied from a gate line and controlling a connection between a first node of the driving transistor and a data line, a storage capacitor connected between the first node of the driving transistor and a second node of the driving transistor, and a driving control diode connected between the second node of the driving transistor and a reference voltage line.

A reference voltage applied to the reference voltage line may be varied.

The reference voltage while the light emitting element emits light may be higher than the reference voltage when the emission of the light emitting element is stopped.

The reference voltage line may cross the data line.

The reference voltage line may be parallel to the gate line.

In another aspect of the present disclosure, a pixel circuit includes a light emitting element, a driving transistor for driving the light emitting element, a scan transistor controlled by a scan signal supplied from a gate line and controlling a connection between a first node of the driving transistor and a data line, a storage capacitor connected between the first node of the driving transistor and a second node of the driving transistor, and a driving control diode connected between the second node of the driving transistor and a reference voltage line A reference voltage applied to the reference voltage line may be varied.

The reference voltage while the light emitting element emits light may be higher than the reference voltage when the emission of the light emitting element is stopped.

During one frame time, the reference voltage sequentially may have a first reference voltage value, a second reference voltage value, and the first reference voltage value. The second reference voltage value may be higher than the first reference voltage value.

According to various aspects of the present disclosure, there may be provided a novel pixel circuit capable of effectively preventing motion blur without complicated driving and a display device including the same.

According to various aspects of the present disclosure, there may be provided a novel pixel circuit capable of reducing the number of gate lines and a display device including the same.

According to various aspects of the present disclosure, there may be provided a novel pixel circuit capable of simplifying driving and having a high aperture ratio, and a display device including the same.

It is to be understood that both the foregoing general description and the following detailed description are exemplary and explanatory and are intended to provide further explanation of the disclosure as claimed.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION

Figure 1:
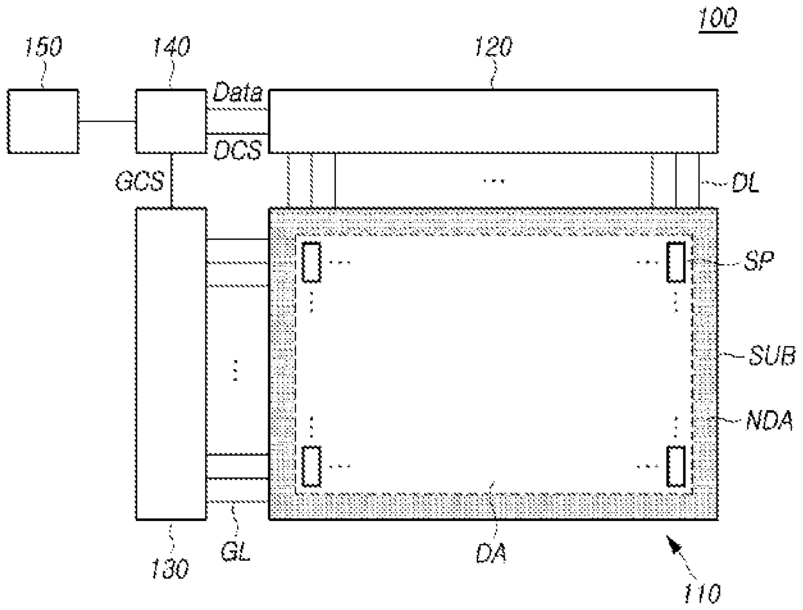
FIG. 1 is a view illustrating a system configuration of a display device according to aspects of the disclosure.

In the following description of examples or aspects of the disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various aspects of the disclosure are described in detail with reference to the accompanying drawings.

FIG. 1 is a view illustrating a system configuration of a display device 100 according to aspects of the disclosure;

Referring to FIG. 1, a display driving system of a display device 100 according to aspects of the disclosure may include a display panel 110 and driving circuits for driving the display panel 110.

The display panel 110 may include a display area DA in which images are displayed and a non-display area NDA in which no image is displayed. The display panel 110 may include a plurality of subpixels SP disposed on a substrate SUB for image display. For example, the plurality of subpixels SP may be disposed in the display area DA. In some cases, at least one subpixel SP may be disposed in the non-display area NDA. At least one subpixel SP disposed in the non-display area NDA is also referred to as a dummy subpixel.

The display panel 110 may include a plurality of signal lines disposed on the substrate SUB to drive the plurality of subpixels SP. For example, the plurality of signal lines may include a plurality of data lines DL and a plurality of gate lines GL. The signal lines may further include other signal lines than the plurality of data lines DL and the plurality of gate lines GL depending on the structure of the subpixel SP. For example, the other signal lines may include driving voltage lines and reference voltage lines.

The plurality of data lines DL and the plurality of gate lines GL may cross each other to define the subpixel SP at the intersection. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction. For ease of description, it is assumed below that each data line DL is disposed to extend in the vertical direction, and each gate line GL is disposed to extend in the horizontal direction.

The driving circuit may include a data driving circuit 120 for driving the plurality of data lines DL and a gate driving circuit 130 for driving the plurality of gate lines GL. The driving circuit may further include a controller 140 for controlling the data driving circuit 120 and the gate driving circuit 130.

The data driving circuit 120 is a circuit for driving the plurality of data lines DL, and may output data signals (also referred to as data voltages) corresponding to an image signal to the plurality of data lines DL. The gate driving circuit 130 is a circuit for driving the plurality of gate lines GL and generate gate signals and output the gate signals to the plurality of gate lines GL.

The controller 140 may start a scan according to the timing implemented in each frame and control data driving at an appropriate time according to the scan. The controller 140 may convert the input image data input from the outside to meet the data signal format used in the data driving circuit 120 and supply the converted image data Data to the data driving circuit 120.

The controller 140 may receive display driving control signals, along with the input image data, from the external host system 150. For example, the display driving control signals may include a vertical synchronization signal VSYNC, a horizontal synchronization signal HSYNC, an input data enable signal DE, and a clock signal.

The controller 140 may generate data driving control signals DCS and gate driving control signals GCS based on display driving control signals input from the host system 150. The controller 140 may control the driving operation and driving timing of the data driving circuit 120 by supplying the data driving control signals DCS to the data driving circuit 120. The controller 140 may control the driving operation and driving timing of the gate driving circuit 130 by supplying the gate driving control signals GCS to the gate driving circuit 130.

The data driving circuit 120 may include one or more source driver integrated circuits SDIC. Each source driver integrated circuit SDIC may include a shift register, a latch circuit, a digital-to-analog converter DAC, and an output buffer. In some cases, each source driver integrated circuit SDIC may further include an analog-digital converter ADC.

For example, each source driver integrated circuit SDIC may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying gate signals of the turn-on level voltage to the plurality of gate lines GL.

The gate driving circuit 130 may be connected with the display panel 110 by TAB method or connected to a bonding pad of the display panel 110 by a COG or COP method or may be connected with the display panel 110 according to a COF method. Alternatively, the gate driving circuit 130 may be formed in a gate in panel (GIP) type, in the non-display area NDA of the display panel 110. The gate driving circuit 130 may be disposed on the substrate or may be connected to the substrate. In other words, the gate driving circuit 130 that is of a GIP type may be disposed in the non-display area NDA of the substrate. The gate driving circuit 130 that is of a chip-on-glass (COG) type or chip-on-film (COF) type may be connected to the substrate.

Meanwhile, at least one of the data driving circuit 120 and the gate driving circuit 130 may be disposed in the display area DA. For example, at least one of the data driving circuit 120 and the gate driving circuit 130 may be disposed not to overlap the subpixels SP or to overlap all or some of the subpixels SP.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The controller 140 may be implemented as a separate component from the data driving circuit 120, or the controller 140 and the data driving circuit 120 may be integrated into an integrated circuit (IC). The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit. The controller 140 may transmit/receive signals to/from the data driving circuit 120 according to one or more predetermined interfaces. The interface may include, e.g., a low voltage differential signaling (LVDS) interface, an EPI interface, and a serial peripheral interface (SP).

The display device 100 according to aspects of the disclosure may be a self-emission display device in which the display panel 110 emits light by itself. When the display device 100 according to the aspects of the disclosure is a self-emission display device, each of the plurality of subpixels SP may include a light emitting element. For example, the display device 100 according to aspects of the disclosure may be an organic light emitting diode display in which the light emitting element is implemented as an organic light emitting diode (OLED). As another example, the display device 100 according to aspects of the disclosure may be an inorganic light emitting display device in which the light emitting element is implemented as an inorganic material-based light emitting diode. As another example, the display device 100 according to aspects of the disclosure may be a quantum dot display device in which the light emitting element is implemented as a quantum dot which is self-emission semiconductor crystal.

Figure 2:
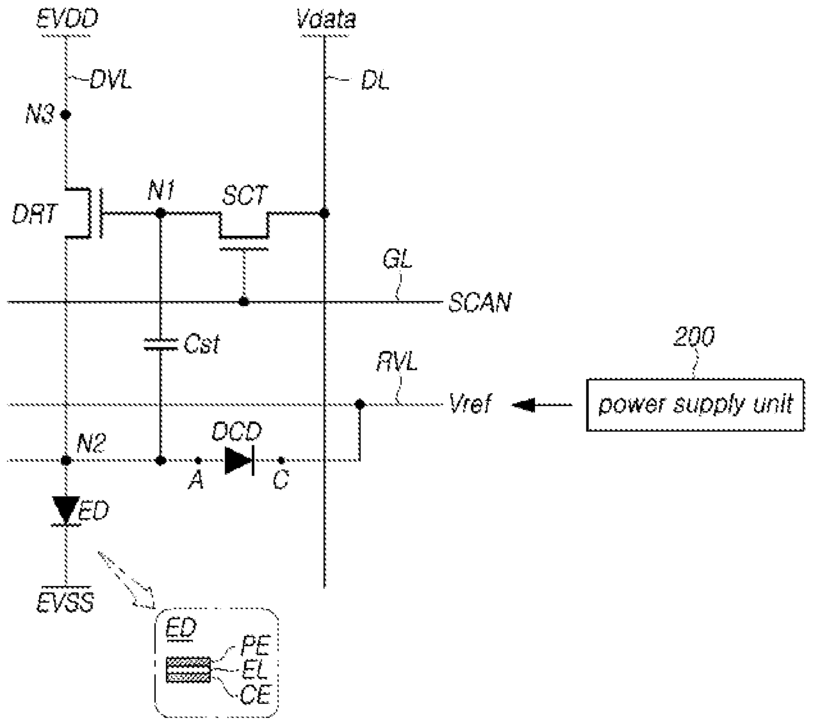
FIG. 2 is a view illustrating a pixel circuit according to aspects of the disclosure.

FIG. 2 is a view illustrating a pixel circuit according to aspects of the disclosure.

Referring to FIG. 2, a pixel circuit included in a display device 100 according to aspects of the disclosure may include a light emitting element ED, a driving transistor DRT for supplying a driving current to the light emitting element ED to drive the light emitting element ED, a scan transistor SCT for transferring a data voltage Vdata corresponding to an image signal to the driving transistor DRT, a storage capacitor Cst for maintaining voltage for a certain period of time, and a driving control diode DCD for controlling the driving state of the subpixel SP.

Referring to FIG. 2, the light emitting element ED may include a pixel electrode PE, a light emitting layer EL, and a common electrode CE.

The pixel electrode PE of the light emitting element ED may be an anode electrode or a cathode electrode. The common electrode CE may be a cathode electrode or an anode electrode.

A base voltage EVSS corresponding to a common voltage may be applied to the common electrode CE of the light emitting element ED. The base voltage EVSS may be, e.g., a ground voltage or a voltage similar to the ground voltage.

For example, the light emitting element ED may be an organic light emitting diode OLED, an inorganic material-based light emitting diode LED, or a quantum dot light emitting element.

Referring to FIG. 2, the driving transistor DRT is a transistor for supplying a driving current to the light emitting element ED for driving the light emitting element ED and may include a first node N1, a second node N2, and a third node N3.

The first node N1 of the driving transistor DRT is a node corresponding to the gate node and may be electrically connected with the source node or drain node of the scan transistor SCT. The second node N2 of the driving transistor DRT is a source or drain node, and may be electrically connected to the anode A of the driving control diode DCD and may be electrically connected to the pixel electrode PE of the light emitting element ED. The third node N3 of the driving transistor DRT may be a drain node or a source node, and may be electrically connected to a driving voltage line DVL that supplies the driving voltage EVDD. Hereinafter, for convenience of description, in the example described below, the second node N2 of the driving transistor DRT may be a source node and the third node N3 may be a drain node.

Referring to FIG. 2, the scan transistor SCT is a transistor for transferring the data voltage Vdata corresponding to the image signal to the driving transistor DRT, and its on/off may be controlled by the scan signal SCAN supplied from the gate line GL and may control a connection between the first node N1 of the driving transistor DRT and the data line DL.

The drain node or source node of the scan transistor SCT may be electrically connected to a corresponding data line DL. The source node or drain node of the scan transistor SCT may be electrically connected to the first node N1 of the driving transistor DRT. The gate node of the scan transistor SCT may be electrically connected to the gate line GL to receive the scan signal SCAN.

The scan transistor SCT may be turned on by the scan signal SCAN of a turn-on level voltage and transfer the data voltage Vdata supplied from the data line DL to the first node N1 of the driving transistor DRT. The scan transistor SCT is turned on by the scan signal SCAN of the turn-on level voltage and turned off by the scan signal SCAN of a turn-off level voltage. When the scan transistor SCT is of the n type, the turn-on level voltage may be a high level voltage, and the turn-off level voltage may be a low level voltage. When the scan transistor SCT is of the p type, the turn-on level voltage may be a low level voltage, and the turn-off level voltage may be a high level voltage.

Referring to FIG. 2, the storage capacitor Cst may be electrically connected between the first node N1 of the driving transistor DRT and the second node N2 of the driving transistor DRT. The storage capacitor Cst may maintain the data signal Vdata corresponding to the image signal voltage or a voltage corresponding thereto for one frame time.

The storage capacitor Cst may be an external capacitor intentionally designed to be outside the driving transistor DRT, but not a parasite capacitor (e.g., Cgs or Cgd) which is an internal capacitor present between the first node N1 and the second node N2 of the driving transistor DRT.

Each of the driving transistor DRT and the scan transistor SCT may be an n-type transistor or a p-type transistor. The driving transistor DRT and the scan transistor SCT both may be n-type transistors or p-type transistors. At least one of the driving transistor DRT and the scan transistor SCT may be an n-type transistor (or a p-type transistor), and the others may be p-type transistors (or n-type transistors).

Referring to FIG. 2, the driving control diode DCD included in the pixel circuit of the display device 100 according to the aspects of the disclosure may be a critical element for controlling the driving state of the subpixel SP and may be connected between the second node N2 of the driving transistor DRT and the reference voltage line RVL.

The driving control diode DCD may be connected between the second node N2 of the driving transistor DRT and the reference voltage line RVL so that a current (forward current) may be conducted from the second node N2 of the driving transistor DRT to the reference voltage line RVL.

The driving control diode DCD may include an anode A electrically connected to the second node N2 of the driving transistor DRT and a cathode C electrically connected to the reference voltage line RVL.

When the voltage of the second node N2 of the driving transistor DRT is higher than the reference voltage Vref applied to the reference voltage line RVL, the driving control diode DCD may be regarded as being in an on state.

When the voltage of the second node N2 of the driving transistor DRT is higher than the reference voltage Vref applied to the reference voltage line RVL, a current (forward current) may flow from the second node N2 of the driving transistor DRT to the reference voltage line RVL through the driving control diode DCD.

As such, as a current (forward current) flows from the second node N2 of the driving transistor DRT to the reference voltage line RVL, current may not be supplied from the driving transistor DRT to the light emitting element ED. Accordingly, the light emitting element ED may be in a state in which it cannot emit light.

When the reference voltage Vref applied to the reference voltage line RVL is higher than the voltage of the second node N2 of the driving transistor DRT, the driving control diode DCD may be regarded as being in an off state.

When the reference voltage Vref applied to the reference voltage line RVL is higher than the voltage of the second node N2 of the driving transistor DRT, a current (forward current) may not flow from the second node N2 of the driving transistor DRT to the reference voltage line RVL through the driving control diode DCD.

Accordingly, the second node N2 of the driving transistor DRT may be in a floating state in which power is not supplied thereto. In other words, the pixel electrode PE of the light emitting element ED may be in an electrically floating state.

If the voltage of the second node N2 of the driving transistor DRT, i.e., the voltage of the pixel electrode PE of the light emitting element ED, rises above the light emission start voltage, current may be supplied from the driving transistor DRT to the light emitting element ED so that the light emitting element ED may emit light. The above-mentioned light emission start voltage may be the sum of the base voltage EVSS and the threshold voltage of the light emitting element ED.

Referring to FIG. 2, in the pixel circuit according to aspects of the disclosure, the reference voltage Vref applied to the reference voltage line RVL may be varied.

In the pixel circuit according to aspects of the disclosure, the reference voltage Vref applied to the reference voltage line RVL while the light emitting element ED emits light may be higher than the reference voltage Vref applied to the reference voltage line RVL when the emission of the light emitting element ED is stopped.

Referring to FIG. 2, in the display device 100 according to aspects of the disclosure, the reference voltage line RVL may be a signal line that is disposed to extend in the same direction as the extending direction of the gate line GL.

Referring to FIG. 2, in the display device 100 according to aspects of the disclosure, the reference voltage line RVL may cross the data line DL. The reference voltage line RVL may be parallel to the gate line GL.

Referring to FIG. 2, the display device 100 according to aspects of the disclosure may further include a power supply unit 200 that varies the reference voltage Vref according to the display driving control information and supplies the varied reference voltage to the reference voltage line RVL.

Figure 3:
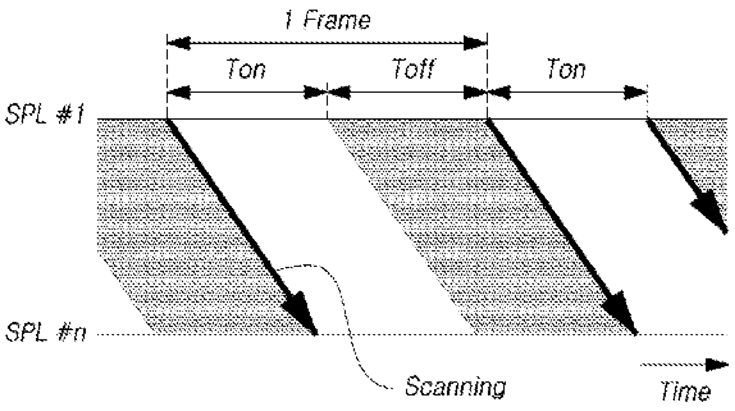
FIG. 3 is a diagram illustrating an operation of a display device according to aspects of the disclosure.

FIG. 3 is a diagram illustrating an operation of a display device 100 according to aspects of the disclosure.

In the diagram of FIG. 3, the y axis denotes a plurality of subpixel lines SPL #1 to SPL #n in the display panel 110, and the x-axis represents the time.

Referring to FIG. 3, the display device 100 according to aspects of the disclosure may perform driving to prevent motion blur. The anti-motion blur driving may be a driving to make a screen state different from the actual image screen between actual images. For example, anti-motion blur driving may be driving such that a black screen or a low grayscale screen is displayed between actual images.

Referring to FIG. 3, according to anti-motion blur driving, a display stop driving period Toff for stopping the display driving for displaying the actual image may proceed between the display driving periods Ton during which the display driving for displaying the actual image is performed.

During one frame time of each of the plurality of subpixels SP, a display driving period Ton and a display stop driving period Toff may proceed.

Scanning of each of the plurality of subpixel lines SPL #1 to SPL #n may be sequentially started, so that display driving for each of the plurality of subpixel rows SPL #1 to SPL #n may be sequentially performed. Accordingly, a real image may be displayed in each area of the plurality of subpixel lines SPL #1 to SPL #n.

The display stop driving period Toff for each of the plurality of subpixel lines SPL #1 to SPL #n may be sequentially started, so that display stop driving for each of the plurality of subpixel lines SPL #1 to SPL #n may be performed sequentially. Accordingly, a fake image different from the actual image may be displayed in the area of each of the plurality of subpixel lines SPL #1 to SPL #n.

For example, since the actual image itself is not displayed on the screen, the screen may be shown, in black or low grayscale, to the user. The screen being shown in black or low gradation may be regarded as a fake image.

As described above, as anti-motion blur driving is performed, it is possible to prevent or reduce motion blur which causes moving objects to appear blurry due to the persistence of an afterimage or data of the previous image.

Figure 4:
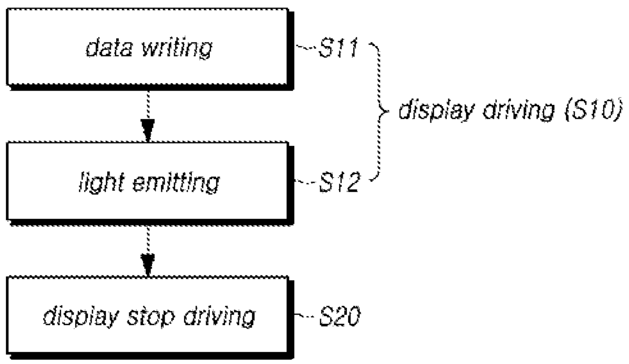
FIG. 4 is a flowchart illustrating a subpixel driving method of a display device according to aspects of the disclosure.

FIG. 4 is a flowchart illustrating a subpixel driving method of a display device 100 according to aspects of the disclosure.

Referring to FIG. 4, a subpixel driving method of the display device 100 according to aspects of the disclosure may be a motion blur preventing driving method and may include a display driving step S10 and a display stop driving step S20.

The display driving step S10 may include a data writing step S11 and a light emitting step S12.

The data writing step S11 may be a step of supplying the data voltage Vdata corresponding to the image signal to the corresponding subpixel SP. In the data writing step S11, the data voltage Vdata for image display may be applied to the first node N1 of the driving transistor DRT.

The light emitting step S12 may be a step in which the light emitting element ED in the corresponding subpixel SP emits light. When each of the plurality of subpixels SP is driven, as the light emitting step S12 proceeds, each of the plurality of subpixels SP emits light to display an image.

The display stop driving step S20 may be a step of performing driving to stop image display. Accordingly, the whole or part of the actual image being displayed on the screen may disappear, and a black or low-grayscale screen may be shown.

Figure 5:
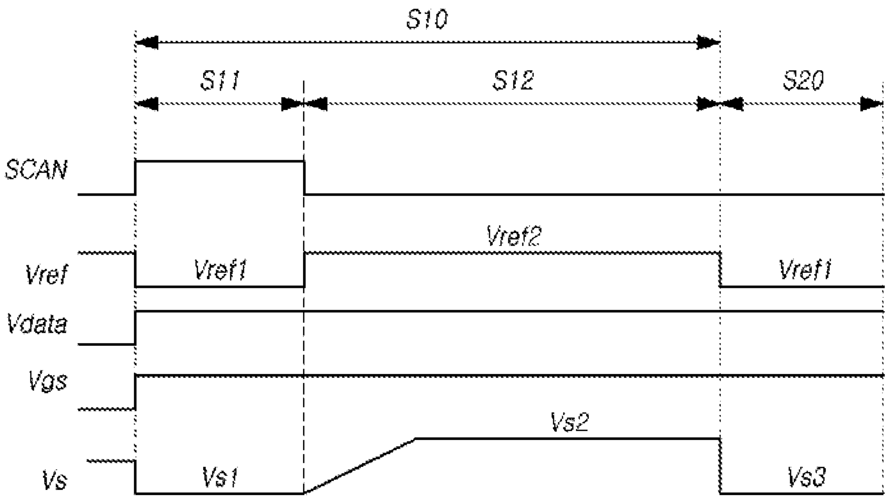
FIG. 5 is a timing diagram illustrating subpixel driving of a display device according to aspects of the disclosure.

FIG. 5 is a timing diagram illustrating subpixel driving of a display device 100 according to aspects of the disclosure.

Referring to FIG. 5, according to the motion blur preventing driving method of the display device 100 according to aspects of the disclosure, the reference voltage Vref applied to the reference voltage line RVL may be varied. Vgs in FIG. 5 represents a voltage between the gate node and the source node (second node N2) of the driving transistor DRT.

Referring to FIG. 5, in the display device 100 according to aspects of the disclosure, the voltage value Vref2 of the reference voltage Vref applied to the reference voltage line RVL while the light emitting element ED emits light (S12) may be higher than the voltage value Vref1 of the reference voltage Vref applied to the reference voltage line RVL when emission of the light emitting element ED is stopped (S20).

Referring to FIG. 5, in the display device 100 according to aspects of the disclosure, as the reference voltage Vref applied to the reference voltage line RVL, a first reference voltage value Vref1 and a second reference voltage value Vref2 may alternate.

In the display device 100 according to aspects of the disclosure, while the data writing step S11 proceeds, the data voltage Vdata corresponding to the image signal may be supplied to the first node N1 of the driving transistor DRT through the data line DL. In this case, the reference voltage Vref applied to the reference voltage line RVL may have the first reference voltage value Vref1.

In the pixel circuit of the display device 100 according to aspects of the disclosure, the reference voltage Vref applied to the reference voltage line RVL during one frame time may sequentially have the first reference voltage value Vref1, the second reference voltage value Vref2, and the first reference voltage value Vref1. The second reference voltage value Vref2 may be higher than the first reference voltage value Vref1.

As described above, each of the plurality of subpixels SP included in the display device 100 according to aspects of the disclosure may include a light emitting element ED, a driving transistor DRT, a scan transistor SCT, a storage capacitor Cst, and a driving control diode DCD.

The driving period of each of the plurality of subpixels SP may include a data writing step S11, a light emitting step S12, and a display stop driving step S20 that are distinguished according to the variation in the reference voltage Vref applied to the reference voltage line RVL. The data writing step S11, the light emitting step S12, and the display stop driving step S20 may be referred to as a first period, a second period, and a third period, respectively.

Figure 6:
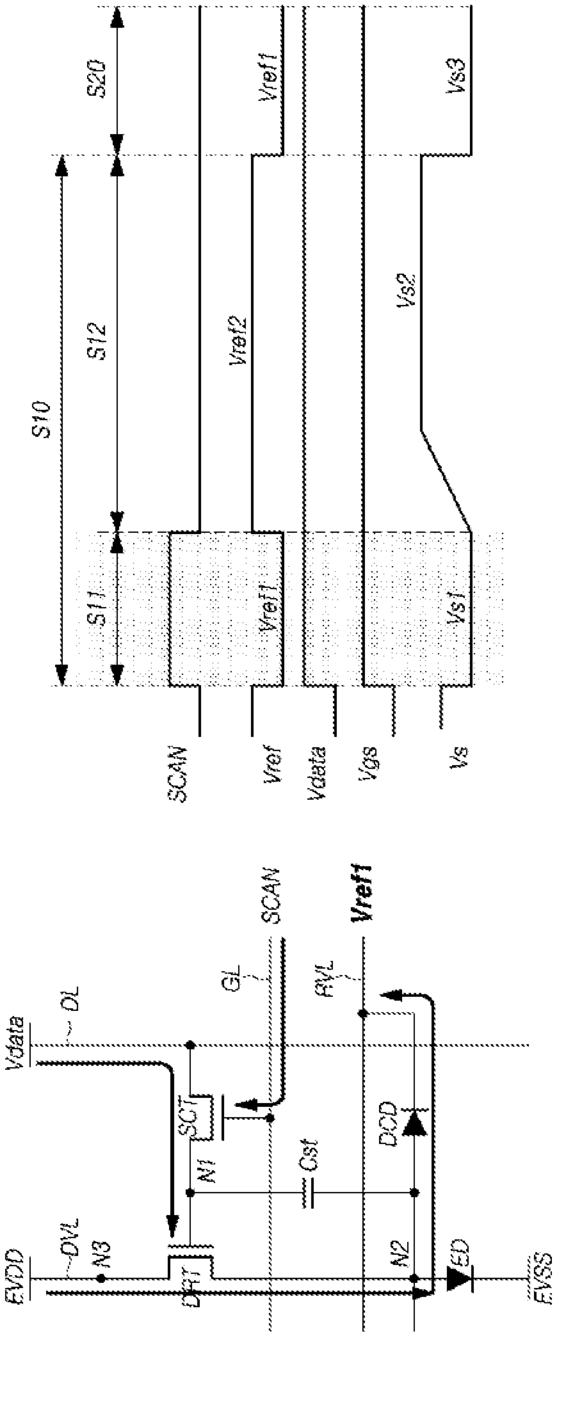
FIG. 6 is a view illustrating a data writing step in a subpixel driving method of a display device according to aspects of the disclosure.
Figure 7:
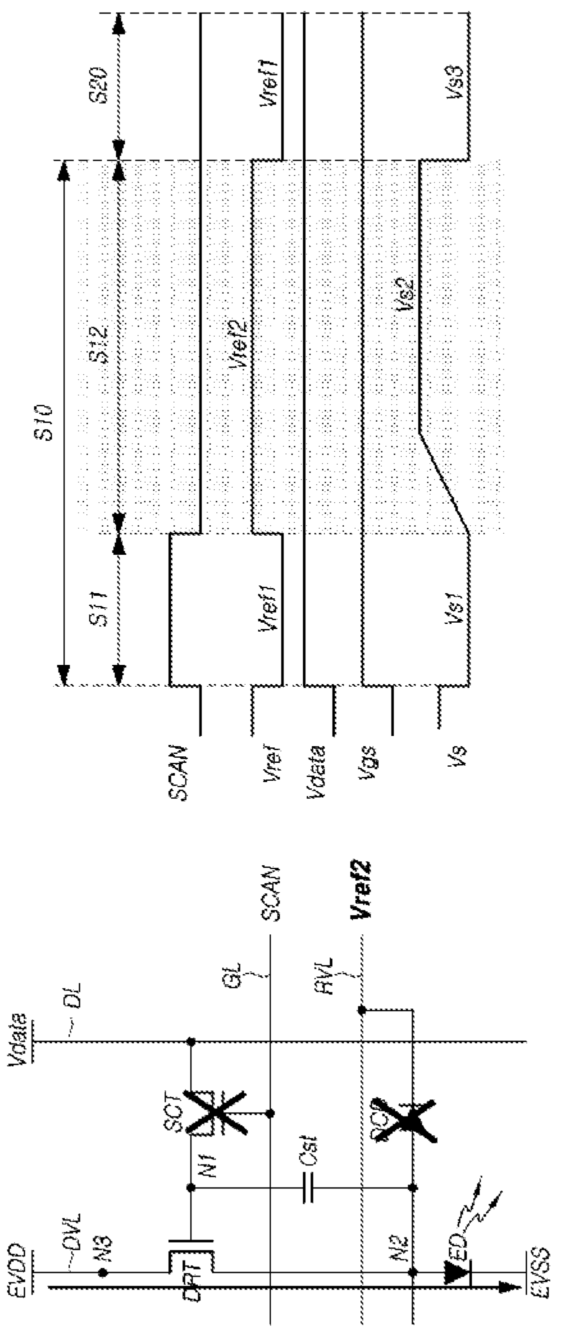
FIG. 7 is a view illustrating a light emitting step in a subpixel driving method of a display device according to aspects of the disclosure.
Figure 8:
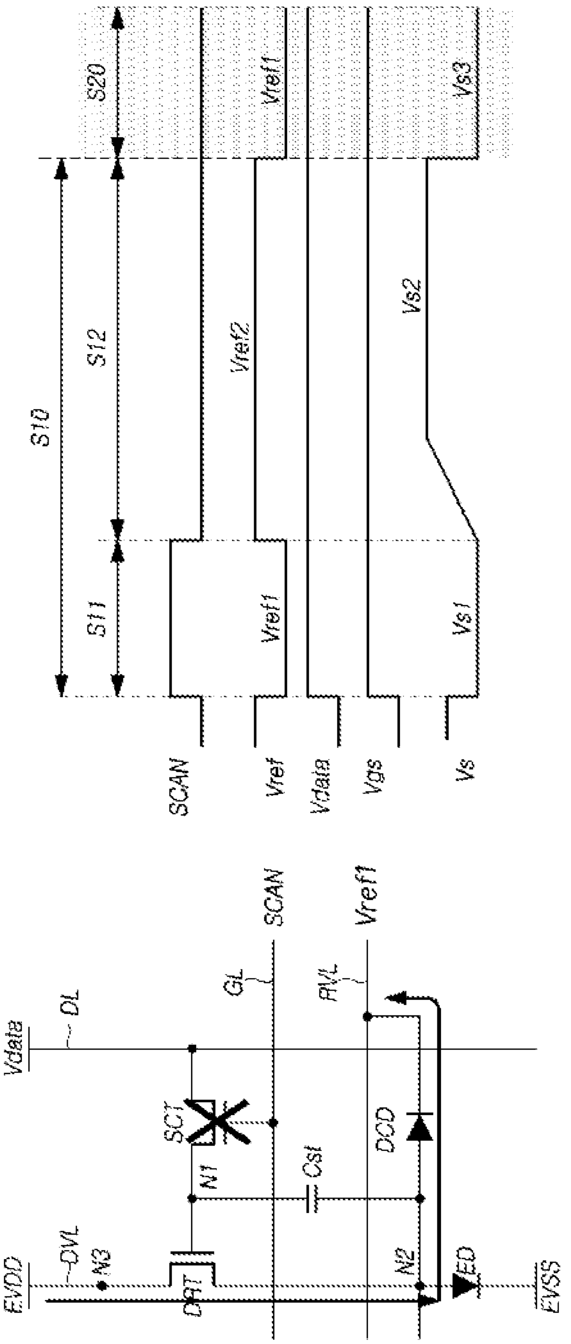
FIG. 8 is a view illustrating a display stop driving step in a subpixel driving method of a display device according to aspects of the disclosure.

FIG. 6 illustrates a first period which is the data writing step S11 in the subpixel driving method of the display device 100 according to aspects of the disclosure. FIG. 7 illustrates a second period which is the light emitting step S12 in the subpixel driving method of the display device 100 according to aspects of the disclosure. FIG. 8 illustrates a third period which is the display stop driving step S20 in the subpixel driving method of the display device 100 according to aspects of the disclosure.

Referring to FIGS. 6 to 8, the data writing step S11, the light emitting step S12, and the display stop driving step S20 may be distinguished according to the reference voltage Vref applied to the reference voltage line RVL. In other words, when the driving step is changed, the reference voltage Vref applied to the reference voltage line RVL may be changed.

Referring to FIGS. 6 to 8, during the data writing step S11, the reference voltage Vref applied to the reference voltage line RVL may have the first reference voltage value Vref1. During the light emitting step S12, the reference voltage Vref applied to the reference voltage line RVL may have the second reference voltage value Vref2 higher than the first reference voltage value Vref1. During the display stop driving step S20, the reference voltage Vref applied to the reference voltage line RVL may have the first reference voltage value Vref1 lower than the second reference voltage value Vref2.

Referring to FIG. 6, during the data writing step S11, the reference voltage Vref applied to the reference voltage line RVL may have the first reference voltage value Vref1.

During the data writing step S11, the scan signal SCAN may have a turn-on level voltage. Accordingly, the scan transistor SCT may be turned on.

During the data writing step S11, the data voltage Vdata corresponding to the image signal output from the data driving circuit 120 to the data line DL may be applied to the first node N1 of the driving transistor DRT through the turned-on scan transistor SCT in the subpixel SP.

During the data writing step S11, the reference voltage Vref may have a relatively low first reference voltage value Vref1.

During the data writing step S11, the voltage of the second node N2 of the driving transistor DRT may have the first voltage value Vs1.

During the data writing step S11, the first voltage value Vs1 may be the sum of the first reference voltage value Vref1 and the threshold voltage value Vth of the driving control diode DCD.

During the data writing step S11, the first voltage value Vs1 of the second node N2 of the driving transistor DRT may be higher than the first reference voltage value Vref1 of the reference voltage Vref applied to the reference voltage line RVL. Accordingly, during the data writing step S11, the driving control diode DCD may conduct current from the second node N2 of the driving transistor DRT to the reference voltage line RVL.

Referring to FIG. 7, during the light emitting step S12, the scan signal SCAN may have a turn-off level voltage. Accordingly, the scan transistor SCT may be turned off. Accordingly, the first node N1 of the driving transistor DRT may be in an electrically floating state and a voltage rise may occur.

During the light emitting step S12, the reference voltage Vref applied to the reference voltage line RVL may have the second reference voltage value Vref2 higher than the first reference voltage value Vref1.

During the light emitting step S12, the second reference voltage value Vref2 may be higher than the first voltage value Vs1, which is the voltage of the second node N2 of the driving transistor DRT in the data writing step S11.

Accordingly, since during the light emitting step S12, the second reference voltage value Vref2 of the reference voltage Vref applied to the reference voltage line RVL is higher than the first voltage value Vs1 which is the voltage of the second node N2 of the driving transistor DRT, the driving control diode DCD has the off state so that the driving control diode DCD may cut off the current from the second node N2 of the driving transistor DRT to the reference voltage line RVL.

Accordingly, during the light emitting step S12, the second node N2 of the driving transistor DRT may be in the electrically floating state, and a voltage rise may occur at the second node N2 of the driving transistor DRT.

During the light emitting step S12, the voltage of the second node N2 of the driving transistor DRT may increase from the first voltage value Vs1 to the second voltage value Vs2 and be saturated at the second voltage value Vs2. During the light emitting step S12, if the voltage of the second node N2 of the driving transistor DRT is saturated, the light emitting element ED may emit light.

Referring to FIG. 8, during the display stop driving step S20 after the light emitting step S12, the scan signal SCAN may continuously maintain the turn-off level voltage. Accordingly, the scan transistor SCT may remain in the turn-off state.

Referring to FIG. 8, at the start timing of the display stop driving step S20 or during the display stop driving step S20, the reference voltage Vref applied to the reference voltage line RVL may have the first reference voltage value Vref1 lower than the second reference voltage value Vref2.

Accordingly, at the start timing of the display stop driving step S20 or during the display stop driving step S20, the driving control diode DCD may conduct current from the second node N2 to the reference voltage line RVL.

In this case, as the charge is discharged from the storage capacitor Cst, the voltage of the second node N2 of the driving transistor DRT may decrease from the second voltage value Vs2 to a predetermined level Vs3. Accordingly, the emission of the light emitting element ED may be stopped.

Referring to FIGS. 6 to 8, before the voltage of the reference voltage line RVL increases, the scan transistor SCT may be in the turn-on state. After the emission of the light emitting element ED is stopped, the scan transistor SCT may be in the turn-off state.

The light emitting element ED and the driving transistor DRT which are circuit elements included in each of the plurality of subpixels SP disposed on the display panel 110 may have their own unique characteristic values. For example, each of the plurality of light emitting elements ED may have a threshold voltage as its unique characteristic value, and each of the plurality of driving transistors DRT may have a threshold voltage and mobility as its unique characteristic values.

As the driving time of the light emitting element ED increases, the characteristic value of the light emitting element ED may be changed. As the driving time of the driving transistor DRT increases, the characteristic value of the driving transistor DRT may be changed.

The plurality of subpixels SP may have different driving times. Accordingly, the variations in the characteristic value of the light emitting elements ED respectively included in the plurality of subpixels SP may differ from each other. Accordingly, a deviation in characteristic value between the light emitting elements ED may occur.

Further, the variations in the characteristic value of the driving transistors DRT respectively included in the plurality of subpixels SP may differ from each other. Accordingly, a deviation in characteristic value between the driving transistors DRT may occur.

The deviation in characteristic value between the light emitting elements ED and the deviation in characteristic value between the driving transistors DRT may cause a luminance deviation between the subpixels SP. Accordingly, the luminance uniformity of the display panel 110 may be deteriorated, reducing image quality.

Since the display device 100 according to aspects of the disclosure has the structure of the subpixel as shown in FIG. 2, it is hard to compensate for the deviations (characteristic value change deviation) in the degree of degradation by directly sensing the degree of degradation (changes in characteristic value) for the circuit elements (e.g., the driving transistor DRT and the light emitting element ED) in each subpixel SP through sensing driving on each subpixel SP.

Accordingly, the display device 100 according to aspects of the disclosure may provide a compensation function in a sensingless-based compensation method, rather than a sensing-based compensation method.

The sensingless-based compensation method according to aspects of the disclosure is a method that grasps the status of accumulated data used when driving for each subpixel SP without sensing driving and real-time senses the degree of degradation of the circuit element in each subpixel SP and compensates for the deviation in degree of degradation. The sensingless-based compensation method according to aspects of the disclosure is described below in greater detail with reference to FIGS. 9 and 10.

Figure 9:
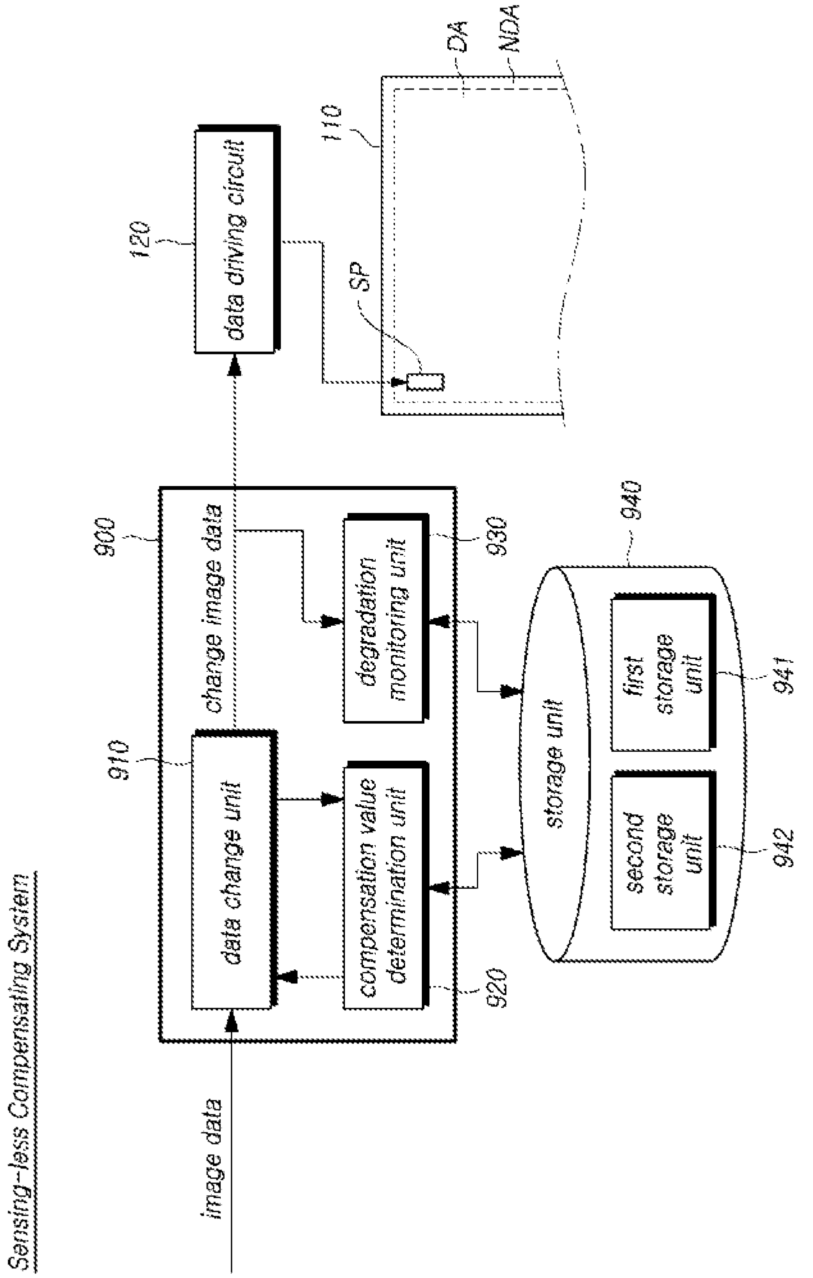
FIG. 9 is a view illustrating a sensingless compensation system according to aspects of the disclosure.
Figure 10:
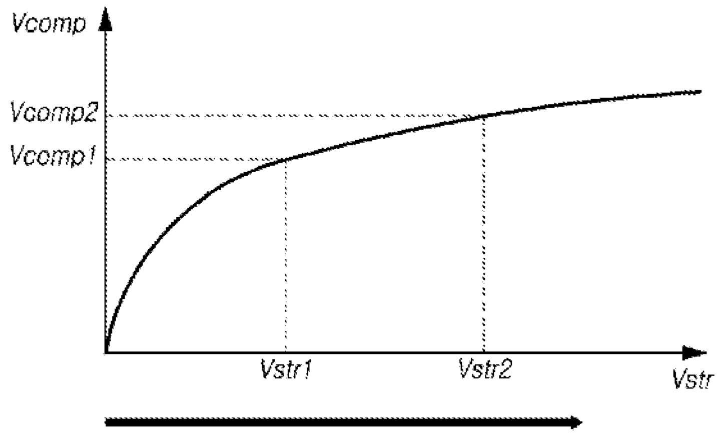
FIG. 10 is a graph illustrating a sensingless compensation method according to aspects of the disclosure.

FIG. 9 illustrates a sensingless compensation system according to aspects of the disclosure. FIG. 10 is a graph illustrating a sensingless-based compensation method according to aspects of the disclosure.

Referring to FIG. 9, the sensingless compensation system according to aspects of the disclosure may include a sensingless compensation module 900 and a storage unit 940.

The sensingless compensation module 900 may generate compensation data including a compensation value corresponding to a degree of degradation of each subpixel SP through data accumulation processing for each subpixel SP without performing sensing driving.

The storage unit 940 may store the compensation data generated by the sensingless compensation module 900. The storage unit 940 may store information (data) indicating the degree of degradation of the circuit element (e.g., light emitting element or driving transistor) disposed in each of the plurality of subpixels SP and may store compensation data including a compensation value corresponding to the degree of degradation for each subpixel SP.

After generating the compensation data, the sensingless compensation module 900 may compress the whole or part of the generated compensation data and store the compressed data in the storage unit 940. Accordingly, the storage space for the compensation data may be significantly reduced.

At least one of the sensingless compensation module 900 and the storage unit 940 may be included in a controller 140. At least one of the sensingless compensation module 900 and the storage unit 940 may be positioned outside the controller 140. In some cases, only part of the configuration included in the sensingless compensation module 900 and the configuration included in the storage unit 940 may be included in the controller 140.

The sensingless compensation module 900 may include a data change unit 910, a compensation value determination unit 920, and a degradation monitoring unit 930.

The data change unit 910 may receive image data from the outside. The data change unit 910 may perform data change processing to change the image data based on the compensation data and output change image data (also referred to as compensated image data), which is the image data changed according to the result of the data change processing, to the data driving circuit 120.

For example, the data change unit 910 may perform data change processing through adding, subtracting, or multiplying the image data for each subpixel SP and the corresponding compensation value based on the image data input from the outside and the compensation data.

The data change unit 910 may identify the compensation data to be added to the image data through the compensation value determination unit 920 to generate the change image data.

The compensation value determination unit 920 may identify the degree of degradation of the circuit element disposed in each of the plurality of subpixels SP based on the data stored in the storage unit 940. The compensation value determination unit 920 may identify the compensation value corresponding to the degree of degradation of the circuit element and output the compensation value to the data change unit 910.

The storage unit 940 may be implemented as a single storage unit or, in some cases, as two or more storage units 941 and 942. For example, the storage unit 940 may include a first storage unit 941 and a second storage unit 942.

The first storage unit 941 may store information (data) about the degree of degradation of the circuit element, accumulated in real-time according to the driving of the subpixel SP. The real-time information about the degree of degradation of each subpixel SP may be referred to as accumulated stress data.

The second storage unit 942 may store the compensation data corresponding to the accumulated stress data. The second storage unit 942 may store the compensation data corresponding to the accumulated stress data, e.g., in the form of a lookup table.

The data change unit 910 may identify the compensation value Vcomp for the accumulated stress data Vstr of each subpixel SP from the compensation data stored in the second storage unit 942 through the compensation value determination unit 920, perform data change processing using the identified compensation value, and output the change image data generated thereby to the data driving circuit 120.

The data driving circuit 120 may generate an analog data voltage Vdata based on the change image data received from the sensingless compensation module 900 and supply the generated data voltage Vdata to the subpixel SP. Accordingly, the data voltage Vdata reflecting the compensation data depending on the degree of degradation of the subpixel SP may be supplied to the subpixel SP.

As an example, as shown in FIG. 10, if the accumulated stress data is a first stress value Vstr1, the change image data reflecting the first compensation value Vcomp1 corresponding to the first stress value Vstr1 may be input to the data driving circuit 120. if the accumulated stress data is a second stress value Vstr2, the change image data reflecting the second compensation value Vcomp2 corresponding to the second stress value Vstr2 may be input to the data driving circuit 120.

The data driving circuit 120 may supply the data voltage Vdata, real-time reflecting the compensation data according to the accumulated stress data of the subpixel SP, to the subpixel SP. The degradation of the circuit element disposed in the support portion SP may be compensated in real-time while the driving of the subpixel SP may be performed.

The accumulated stress data of the subpixel SP may be real-time updated while the subpixel SP is driven.

The degradation monitoring unit 930 may receive the change image data output from the data change unit 910.

The data voltage Vdata according to the change image data is supplied to the subpixel SP so that the subpixel SP may be further degraded as the driving time of the subpixel SP elapses.

The degradation monitoring unit 930 may update the accumulated stress data of the subpixel SP stored in the first storage unit 941 according to the change image data.

Since the accumulated stress data of the subpixel SP is updated by the degradation monitoring unit 930 while the subpixel SP is driven, degradation information about the circuit element in the subpixel SP stored in the first storage unit 941, as the accumulated stress data, may be updated in real-time and managed.

The degradation monitoring unit 930 may store the accumulated stress data of the subpixel SP, as it is, in the first storage unit 941.

Alternatively, the degradation monitoring unit 930 may compress all or a part of the accumulated stress data of the subpixel SP and store the compressed data in the first storage unit 941. In this case, the degradation monitoring unit 930 may perform a compression function and a decompression function on the accumulated stress data. The compression function may also be referred to as an encoding function, and the decompression function may also be referred to as a decoding function.

The compensation value determination unit 920 may identify the degree of degradation of the circuit element disposed in each of the plurality of subpixels SP based on the accumulated stress data stored in the first storage unit 941.

The compensation value determination unit 920 may calculate the compensation value for the corresponding subpixel SP corresponding to the changed degradation of the subpixel SP based on the updated accumulated stress data and update the compensation data stored in the second storage unit 942 with the calculated compensation value.

As described above, the data driving circuit 120 may supply the data voltage Vdata, real-time reflecting the compensation data according to the accumulated stress data of the subpixel SP, to the subpixel SP, rendering it possible to real-time compensate for the degradation of the circuit element disposed in the subpixel SP even without performing sensing driving on the subpixel SP, in display driving of the subpixel SP.

The foregoing aspects are briefly described below.

A display device 100 according to aspects of the disclosure may comprise a light emitting element ED, a driving transistor DRT for driving the light emitting element ED, a scan transistor SCT controlled by a scan signal SCAN supplied from a gate line GL and controlling a connection between a first node N1 of the driving transistor DRT and a data line DL, a storage capacitor Cst connected between the first node N1 of the driving transistor DRT and a second node N2 of the driving transistor DRT, and a driving control diode DCD connected between the second node N2 of the driving transistor DRT and a reference voltage line RVL.

In the display device 100 according to aspects of the disclosure, a reference voltage Vref applied to the reference voltage line RVL may be varied.

In the display device 100 according to aspects of the disclosure, the reference voltage Vref while the light emitting element ED emits light may be higher than the reference voltage Vref when the emission of the light emitting element ED is stopped.

In the display device 100 according to aspects of the disclosure, as the reference voltage Vref, a first reference voltage value Vref1 and a second reference voltage value Vref2 higher than the first reference voltage value Vref1 may alternate.

In the display device 100 according to the aspects of the disclosure, when a data voltage is supplied to the first node N1 of the driving transistor DRT through the data line DL, the reference voltage Vref may have the first reference voltage value Vref1.

In the display device 100 according to aspects of the disclosure, during one frame time, the reference voltage Vref may sequentially have a first reference voltage value Vref1, a second reference voltage value Vref2, and the first reference voltage value Vref1. The second reference voltage value Vref2 may be higher than the first reference voltage value Vref1.

The display device 100 according to aspects of the disclosure may further comprise a power supply unit 200 that varies the reference voltage Vref according to the display driving control information and supplies it to the reference voltage line RVL.

In the display device 100 according to aspects of the disclosure, the driving control diode DCD may include an anode A electrically connected to the second node N2 of the driving transistor DRT and a cathode C electrically connected to the reference voltage line RVL.

In the display device 100 according to aspects of the disclosure, the reference voltage line RVL may be a signal line that is disposed to extend in the same direction as the extending direction of the gate line GL.

In the display device 100 according to aspects of the disclosure, the reference voltage line RVL may cross the data line DL. The reference voltage line RVL may be parallel to the gate line GL.

As described above, each of the plurality of subpixels SP included in the display device 100 according to aspects of the disclosure may include a light emitting element ED, a driving transistor DRT, a scan transistor SCT, a storage capacitor Cst, and a driving control diode DCD.

The driving period of each of the plurality of subpixels SP may include a data writing step S11, a light emitting step S12, and a display stop driving step S20 that are distinguished according to the variation in the reference voltage Vref applied to the reference voltage line RVL. The data writing step S11, the light emitting step S12, and the display stop driving step S20 may be referred to as a first period, a second period, and a third period, respectively.

During the first period which is the data writing step S11, the reference voltage Vref applied to the reference voltage line RVL may have the first reference voltage value Vref1.

During the second period which is the light emitting step S12, the reference voltage Vref applied to the reference voltage line RVL may have the second reference voltage value Vref2 higher than the first reference voltage value Vref1.

During the third period which is the display stop driving step S20, the reference voltage Vref applied to the reference voltage line RVL may have the first reference voltage value Vref1 lower than the second reference voltage value Vref2.

During the data writing step S11, the scan signal SCAN may have a turn-on level voltage.

During the light emitting step S12 and the display stop driving step S20, the scan signal SCAN may have a turn-off level voltage.

During the data writing step S11, the voltage of the second node N2 may have the first voltage value Vs1.

During the light emitting step S12, the voltage of the second node N2 may increase from the first voltage value Vs1 to the second voltage value Vs2, and the light emitting element ED may emit light.

At the start timing of the third period or during the display stop driving step S20, the voltage of the second node N2 may decrease from the second voltage value Vs2, and the emission of the light emitting element ED may be stopped.

During the data writing step S11, the reference voltage Vref may have a first reference voltage value Vref1. During the data writing step S11, the first voltage value Vs1 may be the sum of the first reference voltage value Vref1 and the threshold voltage value Vth of the driving control diode DCD.

During the data writing step S11, the driving control diode DCD may conduct current from the second node N2 to the reference voltage line RVL.

During the light emitting step S12, the driving control diode DCD may cut off the current from the second node N2 to the reference voltage line RVL.

During the display stop driving step S20, the driving control diode DCD may conduct current from the second node N2 to the reference voltage line RVL.

Before the voltage of the reference voltage line RVL increases, the scan transistor SCT may be in the turn-on state.

After the emission of the light emitting element ED is stopped, the scan transistor SCT may be in the turn-off state.

A pixel circuit according to aspects of the disclosure may comprise a light emitting element ED, a driving transistor DRT for driving the light emitting element ED, a scan transistor SCT controlled by a scan signal SCAN supplied from a gate line GL and controlling a connection between a first node N1 of the driving transistor DRT and a data line DL, a storage capacitor Cst connected between the first node N1 of the driving transistor DRT and a second node N2 of the driving transistor DRT, and a driving control diode DCD connected between the second node N2 of the driving transistor DRT and a reference voltage line RVL.

In the pixel circuit according to aspects of the disclosure, a reference voltage Vref applied to the reference voltage line RVL may be varied.

In the pixel circuit according to aspects of the disclosure, the reference voltage Vref applied to the reference voltage line RVL while the light emitting element ED emits light may be higher than the reference voltage Vref applied to the reference voltage line RVL when the emission of the light emitting element ED is stopped.

In the pixel circuit according to aspects of the disclosure, the reference voltage Vref applied to the reference voltage line RVL during one frame time may sequentially have the first reference voltage value Vref1, the second reference voltage value Vref2, and the first reference voltage value Vref1. The second reference voltage value Vref2 may be higher than the first reference voltage value Vref1.

According to aspects of the disclosure as described above, there may be provided a novel pixel circuit capable of effectively preventing motion blur without complicated driving and a display device 100 including the same.

According to aspects of the disclosure, there may be provided a novel pixel circuit capable of reducing the number of gate lines and a display device 100 including the same.

According to aspects of the disclosure, there may be provided a novel pixel circuit capable of simplifying driving and having a high aperture ratio, and a display device 100 including the same.

The above description has been presented to enable any person skilled in the art to make and use the technical idea of the disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the disclosure. The above description and the accompanying drawings provide an example of the technical idea of the disclosure for illustrative purposes only. That is, the disclosed aspects are intended to illustrate the scope of the technical idea of the disclosure. Thus, the scope of the disclosure is not limited to the aspects shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A display device, comprising:

a light emitting device;

a driving transistor driving the light emitting device;

a scan transistor controlled by a scan signal supplied from a gate line and controlling a connection between a first node of the driving transistor and a data line;

a storage capacitor connected between the first node of the driving transistor and a second node of the driving transistor;

a driving control diode connected between the second node of the driving transistor and a reference voltage line; and a plurality of subpixels, each of the plurality of subpixels including the light emitting device, the driving transistor, the scan transistor, the storage capacitor, and the driving control diode, wherein each of the plurality of subpixels is driven during a driving period sequentially repeating a first period of a data writing period, a second period of a light emitting period and a third period of a display stop driving period, during the data writing period, the first node of the driving transistor is supplied with a data voltage corresponding to an image signal to a corresponding subpixel, during the light emitting period, the light emitting device in the corresponding subpixel emits light, and during the display stop driving period, the light emitting device stops displaying an actual image representing the image signal supplied to the corresponding subpixel and displaying a fake image different from the actual image.

2. The display device of claim 1, wherein a reference voltage applied to the reference voltage line is varied.

3. The display device of claim 2, wherein the reference voltage when the light emitting device emits light is higher than the reference voltage when the light emitting device stops emitting the light.

4. The display device of claim 2, wherein, as the reference voltage, a first reference voltage value and a second reference voltage value higher than the first reference voltage value alternate, and wherein, when a data voltage is supplied to the first node of the driving transistor through the data line, the reference voltage is the same as the first reference voltage value.

5. The display device of claim 2, wherein, during one frame time, the reference voltage sequentially has a first reference voltage value, a second reference voltage value, and the first reference voltage value, and wherein the second reference voltage value is higher than the first reference voltage value.

6. The display device of claim 2, further comprising a power supply device varying the reference voltage according to display driving control information and supplying the varied reference voltage to the reference voltage line.

7. The display device of claim 1, wherein the driving control diode includes an anode electrically connected with the second node of the driving transistor and a cathode electrically connected with the reference voltage line.

8. The display device of claim 1, wherein the reference voltage line crosses the data line.

9. The display device of claim 1, wherein the reference voltage line is parallel to the gate line.

10. The display device of claim 1, wherein, during the first period, a reference voltage has a first reference voltage value, wherein, during the second period, the reference voltage has a second reference voltage value higher than the first reference voltage value, and wherein, during the third period, the reference voltage has the first reference voltage value lower than the second reference voltage value.

11. The display device of claim 1, wherein, during the first period, the scan signal has a turn-on level voltage, and wherein, during the second period and the third period, the scan signal has a turn-off level voltage.

12. The display device of claim 1, wherein, during the first period, a voltage of the second node has a first voltage value, wherein, at the start timing of the third period or during the second period, the voltage of the second node increases from the first voltage value to a second voltage value, and the light emitting device emits light, and wherein, during the third period, the voltage of the second node decreases from the second voltage value, and the emission of the light emitting device is stopped.

13. The display device of claim 12, wherein, during the first period, a reference voltage has a first reference voltage value, and wherein, during the first period, the first voltage value is a sum of the first reference voltage value and a threshold voltage value of the driving control diode.

14. The display device of claim 1, wherein, during the first period, the driving control diode conducts current from the second node to the reference voltage line, wherein, during the second period, the driving control diode cuts off the current from the second node to the reference voltage line, and wherein, during the third period, the driving control diode conducts current from the second node to the reference voltage line.

15. The display device of claim 1, wherein, before a voltage of the reference voltage line increases, the scan transistor is in a turn-on state, and after emission of the light emitting device is stopped, the scan transistor is in a turn-off state.

16. The display device of claim 1, further comprising:

a sensingless compensation system generating compensation data including a compensation value corresponding to a degree of degradation of at least one subpixel through data accumulation processing for at least one subpixel; and a storage device storing the compensation data.

17. The display device of claim 16, wherein the sensingless compensation system stores compressed data obtained by compressing a whole or part of the compensation data in the storage device.

18. A pixel circuit, comprising:

a light emitting device;

a driving transistor driving the light emitting device;

a scan transistor controlled by a scan signal supplied from a gate line and controlling a connection between a first node of the driving transistor and a data line;

a storage capacitor connected between the first node of the driving transistor and a second node of the driving transistor;

a driving control diode connected between the second node of the driving transistor and a reference voltage line; and a plurality of subpixels, each of the plurality of subpixels including the light emitting device, the driving transistor, the scan transistor, the storage capacitor, and the driving control diode, wherein each of the plurality of subpixels is driven during a driving period sequentially including a first period of a data writing period, a second period of a light emitting period and a third period of a display stop driving period, during the data writing period, the first node of the driving transistor is supplied with a data voltage corresponding to an image signal to a corresponding subpixel, during the light emitting period, the light emitting device in the corresponding subpixel emits light, and during the display stop driving period, the light emitting device stops displaying an actual image representing the image signal supplied to the corresponding subpixel and displaying a fake image different from the actual image.

19. The pixel circuit of claim 18, wherein a reference voltage applied to the reference voltage line is varied.

20. The pixel circuit of claim 19, wherein the reference voltage when the light emitting device emits light is higher than the reference voltage when the light emitting device stops emitting the light.

21. The pixel circuit of claim 19, wherein, during one frame time, the reference voltage sequentially has a first reference voltage value, a second reference voltage value, and the first reference voltage value, and wherein the second reference voltage value is higher than the first reference voltage value.

22. The pixel circuit of claim 1, wherein an anode of the driving control diode is directly electrically connected to the second node of the driving transistor that is a source or drain node thereof.

* * * * *